United States Patent Office 3,201,446
Patented Aug. 17, 1965

3,201,446
N-(DIETHOXYPHOSPHINOTHIOYL)-2,2,2-TRICHLOROACETAMIDE
Henry Tolkmith, Midland, Mich., assignor to The Dow Chemical Company, Midland, Mich., a corporation of Delaware
No Drawing. Filed Jan. 10, 1964, Ser. No. 336,891
1 Claim. (Cl. 260—461)

The present invention is directed to phosphorylated acetamide compounds and is particularly directed to the compound N-(diethoxyphosphinothioyl)-2,2,2-trichloroacetamide, having the formula

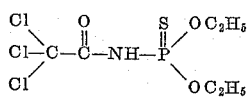

The novel compound is an oil at room temperature and of low solubility in water, but is soluble in many common organic solvents, such as, for example, acetone, and benzene. The compound is useful as a parasiticide and herbicide. It is adapted to be employed for the control of a number of plant, fungal, mite, helminth, insect, and nematode organisms, such as Tetranychus bimaculatus, plum curculio, crabgrass, and millet. The compound is also useful as a rodenticide.

The compound of the present invention is prepared by reacting O,O-diethyl phosphoramidothioate, of the formula

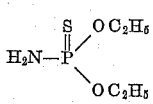

with trichloroacetyl chloride, of the formula

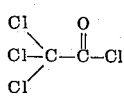

The reaction is carried out in the presence of an acid binding agent, such as an organic tertiary amine, and conveniently in an organic liquid as inert reaction medium. Suitable organic liquids are diethyl ether, benzene, carbon tetrachloride, or methylene chloride. Good results are obtained when employing the reactants and the acid binding agent in substantially equimolecular proportions. The reaction takes place smoothly at temperatures of from −20° to 70° C., and preferably, at or near room temperatures, with the production of the desired product and chloride of reaction. The chloride appears in the reaction mixture as the chloride salt of the binding agent.

In carrying out the reaction, the reactants and acid binding agent are contacted together in any convenient fashion and maintained for a period of time in the reaction temperature range to complete the reaction. Thus, for example, O,O-diethyl phosphoramidothioate is contacted with trichloroacetyl chloride in the presence of the acid binding agent and in the reaction temperature range. Some product is produced immediately upon the contacting together of the reactants; however, higher yields result when the reaction mixture is permitted to stand for a period of time in the reaction temperature range. Following the completion of the reaction, the reaction mixture can be filtered and the reaction medium removed by distillation or evaporation under reduced pressure to obtain the desired product as a residue. This product can be purified by conventional procedures, such as washing with water and recrystallization.

In a specific embodiment, 300 milliliters of benzene, 22.0 grams of triethylamine (0.21 mole), and 34.0 grams of O,O-diethyl phosphoramidothioate (0.2 mole) were mixed together to prepare a first mixture. A second mixture of 36.5 grams of trichloroacetyl chloride (0.2 mole) in 300 milliliters of benzene was added portionwise over a period of time and at room temperature of about 25° C. to the first mixture. The resultant reaction mixture was maintained at room temperature for a period of time to complete the reaction. Thereafter, the reaction mixture was filtered, the filtrate washed with water, and the benzene removed from the washed filtrate by evaporation to obtain the N-(diethoxyphosphinothioyl)-2,2,2-trichloroacetamide product as a residue. The product residue was purified by solvent extraction with cyclohexane, and the purified product found to be an oil having a refractive index $n_D$ 1.5000.

When the compound of the present invention is employed as a parasiticide and herbicide, the product can be dispersed on a finely divided solid such as chalk or talc or a finely divided solid surface active dispersing agent and the resulting product employed as a dust. Such mixture can also be dispersed in water and employed as spray. In other procedures, the product can be employed as an active constituent in solvent solutions, water-in-oil or oil-in-water emulsions, or aqueous dispersions. In representative operations, an aqueous dispersion containing as sole active ingredient 4,000 parts of N-(diethoxyphosphinothioyl)-2,2,2-trichloroacetamide per million parts by weight of ultimate mixture, when applied as a thorough wetting spray to young crabgrass plants, was found to give 100 percent kill and control of the crabgrass plants.

I claim:
N-(diethoxyphosphinothioyl)-2,2,2-trichloroacetamide.

References Cited by the Examiner
UNITED STATES PATENTS
2,894,019   7/59   Maeder _____ 260—461.106
2,957,020  10/60   Perkow _____ 260—461.106

OTHER REFERENCES
Kirsanov et al.: "Chem. Abst.," vol. 51, col. 1821 (1957).

CHARLES B. PARKER, Primary Examiner.